Jan. 19, 1932.   J. D. ESARY ET AL   1,841,721
POLE GRAB
Filed Dec. 7, 1929
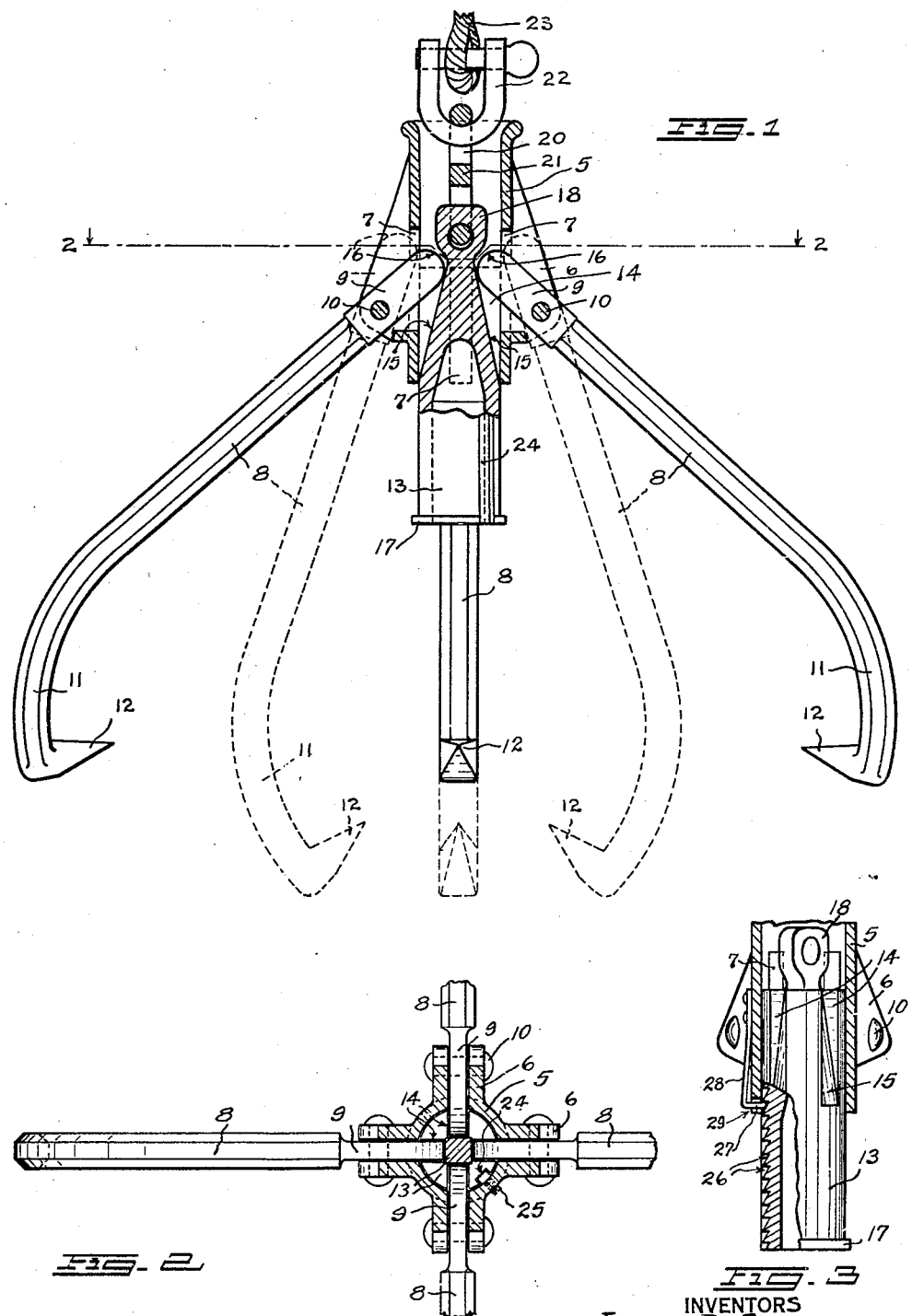
INVENTORS
James D. Esary
D. Porter Garrison
BY Fred C. Matheny
ATTORNEY Patented Jan. 19, 1932

1,841,721

UNITED STATES PATENT OFFICE

JAMES D. ESARY, OF SEATTLE, WASHINGTON, AND DANIEL PORTER GARRISON, OF DUNCAN, BRITISH COLUMBIA, CANADA

POLE GRAB

Application filed December 7, 1929. Serial No. 412,337.

Our invention relates to improvements in pole grabs of a form adapted to grip the end of a cylindrical object, as a pole, for moving the same and the primary object of our invention is to provide a four point pole grab of simple and efficient construction which is light enough in weight to be easily handled and carried by one man and which will grip poles in such a manner that said poles may be hauled out of the woods, through and around standing and fallen trees and stumps and other obstructions and over uneven ground, without danger of the end of the poles catching on any of said obstructions while they are being moved.

Other objects are to provide a pole grab which is easy to apply to the end of a pole and which is not liable to be disengaged from the end of the pole by accident, but which may readily be disengaged voluntarily by an operator; to provide a pole grab which automatically adjusts itself to the size of the pole to which it is applied; to provide a pole grab which forms a guard and deflector extending over the front end of the pole; to provide a pole grab which grips the pole in such a manner that the pull exerted on the pole grab and the pole is substantially in axial alignment with the pole; and to provide a pole grab in which the hooks are forced into the pole and held in engagement with the pole by devices which are connected with a hauling line and are arranged to exert a pressure against said hooks when tension is exerted on the hauling line.

Other and more specific objects of our invention will be apparent from the following description taken in connection with the accompanying drawings.

In the logging of standing timber in which smaller trees of a size suitable for poles are intermixed with larger, heavier trees it has been found that if the heavier timber is felled and taken out before, or at the same time as the smaller trees or poles, then the poles will be badly broken up and a great loss will occur. It is possible, however, to fell and take out the smaller trees or poles first without damaging the heavier timber. For this reason it is desirable to fell and take out the poles before logging off the heavier timber. This obviously necessitates dragging the poles out through the, then standing, heavier timber and over and under fallen trees, and through stumpage and all of the other ground obstructions common to a heavy forest, and usually over uneven ground including hills, gullies, canyons and the like.

Where this is done it is obvious that if a line or choker is looped around a pole near one end in the usual manner for the purpose of dragging the pole out endwise the forward end of the pole will be unprotected and will strike against, and catch on, the various obstructions with which it comes in contact, thus making it necessary to slack up the hauling line and expend time and labor in freeing the pole from the obstruction. This often has to be repeated many times in dragging a pole out to a loading place.

To overcome this difficulty we provide what we term a pole grab for fitting over and taking hold of the end of a pole and shielding the end of said pole while the pole is being dragged through the timber. This pole grab embodies a plurality of hooks arranged to fit over and engage with the end of a pole and convergent in front of said pole and having their convergent ends connected with a line or cable by which a pull may be exerted substantially coaxial with said pole, and further embodies means for pressing the hooks into a pole when a pull is exerted thereon and for holding said hooks in engagement with the pole if the pull is slackened or until such time as the hooks are voluntarily disengaged.

In the accompanying drawings Fig. 1 is a sectional view, with parts shown in elevation, of a pole grab constructed in accordance with our invention, the hooks being shown in their open position by full lines and in their closed position by dotted lines.

Fig. 2 is a sectional view substantially on broken line 2—2 of Fig. 1, with parts of the hook members broken away.

Fig. 3, is a fragmentary view of a modified form of the invention.

Referring to the drawings, throughout which like reference numerals designate like parts, we show a pole grab embodying a tubular housing member 5 having a plurality of pairs of externally disposed spaced apart lugs 6. In this disclosure we have shown four pairs of lugs but it will be understood that one pair of lugs is provided for each hook that is used on the pole grab and that more or less than four hooks may be used if desired. A longitudinal slot 7 is provided in the housing wall between each pair of lugs to afford an opening into the interior of the housing member 5, and a plurality of hook arms 8 each has a flattened upper end 9 fulcrumed on a pivot 10 which extends through one set of the lugs 6. The outer ends of the hook arms 8 are curved inwardly as at 11 so as to clear the end of a pole and each terminate in inwardly directed spike portions 12 which are arranged to hook into the end of a pole.

A hook operating member 13 is slidably and reciprocably disposed within the housing member 5. The forward end of said hook operating member is provided with a plurality of slots 14 affording inclined surfaces 15 with which rounded ends 16 at the upper extremities of the hook arms may engage.

The rear end of the hook operating member 13 has a flange 17 which is arranged to strike against the end of the housing 5 and forms a stop which prevents the hook operating member from being drawn entirely through the housing 5. The forward end of the hook operating member has an eye 18 formed thereon and a link 20 is welded or otherwise secured in said eye. A cross piece or block 21 is rigidly secured in the link 20 mid way between its two ends and a clevis 22 or other means to which a hauling line 23 may be secured is connected with the outer end of the link 20. The block 21 forms means with which the clevis 22 may engage to permit the member 13 to be moved rearwardly when releasing the hooks. The forward end of the housing is expanded or belled outward slightly to afford a better surface for the link 20 and clevis 22 to draw against when the pull is at an angle. The clevis 22 is large enough to abut against the end of the housing 5 and prevent the member 13 from dropping out of the housing 5.

The hook operating member 13 is provided on one side with a groove 24 in which the end of a stud screw 25 may engage to prevent rotary movement of the hook operating member 13 in the housing 5. This screw preferably has a head on the inner end and is screwed firmly into the housing 5 before the member 13 is inserted.

This pole grab is preferably, though not essentially provided with four hooks to give a four point engagement with a pole. The device, when made for poles up to eighteen inches in diameter is not heavy and may be easily carried and handled by one man and it is self adjusting to any size of pole up to the maximum for which it is designed.

The device is applied to a pole by spreading the hooks apart and passing them over the end of the pole and then pressing the points 12 inwardly against the pole. When the pole grab is thus applied and a pull is exerted on the hook operating member, two forces will be exerted tending to cause the hook points 12 to penetrate the pole, one force being the endwise pull of the hauling line and the other force being the pressure of the inclined surfaces 15 against the rounded ends 16 of the hooks. As the pull increases both of these forces will increase and the hooks will be forced into more firm engagement with the pole and there will be no tendency for the hooks to release while the pull is maintained, or even after the pull is slackened, unless the member 13 is moved rearwardly. If the pull is released without moving the member 13 rearwardly said member 13 will still hold the hooks in the engaged position.

The line of pull is always substantially in axial alignment with the pole and the pole grab acts as a guard and deflector in front of the pole to prevent the end of the pole from encountering obstacles, it being obvious that the inclined hook portions 8 in front of the end of the pole will always come in contact with the obstacle first and be deflected sidewise before the pole can engage the obstacle. By the use of this device it is possible to haul out poles by tortuous paths, the hauling line being drawn around stumps and standing trees and under and over fallen timber.

The hooks are not attached to the slide member 13 and consequently said member 13 may be moved rearwardly without disengaging the hooks. If the pole starts to slide down grade with this device on it and the clevis 22 and link 20 bump against an obstruction, the slide member 13 may move rearwardly in the housing 5 without releasing the hooks and gripping pressure on the hooks will again be exerted as soon as the hauling line again becomes taut.

This pole grab adjusts itself automatically to the size of the pole to which it is applied and the hook arms only overhang the edges of the pole a slight amount regardless of the size of the pole and do not constitute a needlessly large deflector in front of a small pole.

This device is strong and durable in construction and reliable and efficient in operation. It is light enough in weight so that the device with several hundred feet of cable attached thereto can easily be carried by one man. If desired the device may be made larger and heavier for use on larger timber.

In Fig. 3 we show ratchet means for locking the member 13 in a clamping position to prevent accidental release of the hooks in case the tension on the hauling line is slackened. This means may be in the nature of ratchet teeth 26 fixedly connected with the member 13 and engaged by a hook 27 on the end of a spring 28. The spring 28 is secured to the exterior of the housing 5 and the hook 27' may project through a notch 29 at the bottom edge of said housing. This prevents rearward movement of the slide member 13 except when the hook 27 is voluntarily withdrawn from the ratchet teeth.

The foregoing description and accompanying drawings clearly disclose a preferred embodiment of our invention but it will be understood that this disclosure is merely illustrative and that changes in the device may be made within the scope and spirit of the following claims.

We claim:

1. A pole grab embodying a tubular housing, a hook operating member having inclined walls thereon and slidable reciprocably within said housing, hauling means connected with said hook operating member, and a plurality of hook members spaced around said housing and each pivotally connected near one end with the exterior of said housing, said hook members having inwardly directed spikes on their other ends and the pivoted ends of said hook members extending into said housing and being arranged to be engaged by the inclined walls of said hook operating member to move the spiked ends of said hooks together when a pull is exerted on said hauling means.

2. The apparatus as claimed in claim 1 in which one end of the hook operating member is connected with the hauling means within the housing and the other end of said hook operating member projects outwardly from said housing and is provided with stop means to prevent it from being drawn through the housing.

3. The apparatus as claimed in claim 1 in which the housing and the hook operating member are cylindrical and relative rotary movement therebetween is prevented by means of a fixed stud in the housing which extends into a longitudinal groove in the hook operating member.

4. A pole engaging device of the class described, embodying a tubular housing, a hook operating member having inclined walls thereon and slidable reciprocably within said housing, hauling means extending into one end of said housing and connected with said hook operating member, and a plurality of hooks spaced around said housing and pivotally connected near one end with said housing, said hooks having inwardly directed spikes on their outer ends, the pivoted ends of said hooks extending into said housing and engaging the inclined walls of said hook operating member whereby the spiked ends of said hooks will be moved when a pull is exerted on said hauling means and will be free to be moved apart when tension on the hauling means is relaxed.

5. A pole grab, embodying a tubular housing having a plurality of longitudinally arranged spaced apart slots in the walls thereof, a pair of lugs extending outwardly from the housing at the location of each slot, hook arms pivoted between said lugs and extending into said slots, the inner ends of said hook arms being rounded and the outer ends of said hook arms having inwardly directed spikes thereon, a hook operating member slidable within said housing and having grooves therein affording inclined walls with which the rounded ends of the hook arms engage whereby the spiked ends of the hooks will be moved inwardly when the hook operating member is drawn into the housing, link means connected with the outer end of said hook operating member and a hauling line secured to said link means.

6. A pole grab, embodying a tubular housing having four equidistantly spaced longitudinal slots in the walls thereof, lugs extending outwardly from the housing on each side of each slot, four hook arms each having a flattened portion extending between said lugs and through said slots, the ends of said flattened portions being rounded, pivot pins extending through said lugs and said hook arms for pivotally securing the arms to the housing, inwardly directed spikes on the outer ends of said hook arms, a hook operating member slidable within said housing and having peripheral grooves in its upper end affording inclined walls for engaging the rounded upper ends of said hooks and a hauling line attached to said hook operating member.

7. A pole grab embodying a housing, a plurality of hook members pivotally connected near one end with said housing and having inwardly directed spikes on their other ends, a hook operating member slidable relative to said housing for moving the spiked ends of said hooks together to grip an object and for holding said hooks in the gripping position said hooks being engaged by said hook operating member but being disconnected therefrom, releasable locking means for holding said hook operating member in engaged position relative to said hooks, and hauling devices connected with said hook operating member.

The foregoing specification signed at Seattle, Wash., Nov. 26, 1929.

JAMES D. ESARY,
D. PORTER GARRISON.